(12) United States Patent
Bergman

(10) Patent No.: US 9,912,631 B2
(45) Date of Patent: Mar. 6, 2018

(54) CONTENT NODE SELECTION BASED ON CLASSLESS PREFIX

(71) Applicant: Fastly, Inc., San Francisco, CA (US)

(72) Inventor: Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 694 days.

(21) Appl. No.: 14/485,381

(22) Filed: Sep. 12, 2014

(65) Prior Publication Data

US 2015/0188881 A1 Jul. 2, 2015

Related U.S. Application Data

(60) Provisional application No. 61/920,957, filed on Dec. 26, 2013.

(51) Int. Cl.
| H04L 29/12 | (2006.01) |
|---|---|
| H04L 29/08 | (2006.01) |
| H04L 29/06 | (2006.01) |
| H04L 12/751 | (2013.01) |

(52) U.S. Cl.
CPC ........ H04L 61/2007 (2013.01); H04L 45/025 (2013.01); H04L 65/60 (2013.01); H04L 67/02 (2013.01); H04L 61/1511 (2013.01); H04L 61/6077 (2013.01); H04L 61/6095 (2013.01); H04L 67/101 (2013.01)

(58) Field of Classification Search
CPC ..... H04L 61/2007; H04L 65/60; H04L 67/02; H04L 61/1511; H04L 61/6095; H04L 45/025; H04L 61/6077; H04L 67/101
See application file for complete search history.

(56) References Cited

U.S. PATENT DOCUMENTS

| 6,237,061 B1 | 5/2001 | Srinivasan et al. |
|---|---|---|
| 6,850,984 B1 | 2/2005 | Kalkunte et al. |
| 9,608,930 B1* | 3/2017 | Brandwine ............. H04L 47/70 |
| 2002/0087722 A1* | 7/2002 | Datta ................ H04L 29/12066 709/239 |
| 2005/0198269 A1* | 9/2005 | Champagne ............ H04L 45/00 709/224 |

(Continued)

OTHER PUBLICATIONS

Cedric De Launois, The Paths toward IPv6 Multihoming, 2nd Quarter 2006, IEEE Communications Surveys & Tutorials, vol. 8, No. 2, 38-50.*

(Continued)

*Primary Examiner* — Wing F Chan
*Assistant Examiner* — Billy H Ng

(57) ABSTRACT

Systems, methods, apparatuses, and software that announce prefixes associated content nodes of a content delivery network are provided herein. In one example, a method of operating a communication system comprising Internet service providers configured to exchange content requests between end user devices and content nodes is presented. The method includes assigning a content node of the content delivery network a first Internet Protocol (IP) address having an associated first short prefix and a first long prefix, and assigning the content node a second IP address having an associated second short prefix and a second long prefix. The method also includes announcing the first short prefix and the first long prefix to a first Internet service provider communicatively coupled to the content node, and announcing the second short prefix and the second long prefix to a second Internet service provider communicatively coupled to the content node.

11 Claims, 10 Drawing Sheets

(56) References Cited

U.S. PATENT DOCUMENTS

| | | | |
|---|---|---|---|
| 2007/0201479 A1 | 8/2007 | Ishiyama et al. | |
| 2008/0123651 A1* | 5/2008 | Vasseur | H04L 12/4633 370/392 |
| 2009/0019180 A1* | 1/2009 | Aso | H04W 8/065 709/238 |
| 2009/0257439 A1 | 10/2009 | Xu | |
| 2014/0215038 A1* | 7/2014 | Donley | H04L 61/2015 709/223 |
| 2015/0029864 A1* | 1/2015 | Raileanu | H04L 47/122 370/237 |
| 2016/0239772 A1* | 8/2016 | Dahlberg | G06Q 10/0635 |

OTHER PUBLICATIONS

Bu, Tian et al. "On Characterizing BGP Routing Table Growth." IEEE Global Telecommunications Conference. 2002.

Senevirathna, Kosala S., et al. "IPv6 Multi-Homing with Structured CIDR." Industrial and Information Systems (ICIIS), 2011 6th IEEE International Conference. 2011.

Baker, F. et al. "Multihomed IPv6 Prefix Delegation, Aggregation, and Distribution." Cisco Systems. 2006.

Bohdanowicz, Frank et al. "Loop Detection and Automated Route Aggregation in Distance Vector Routing." University of Koblenz, Germany. IEEE Symposium on Computers and Communications. 2014.

Fuller, V. et al. "Classless Inter-Domain Routing (CIDR): The Internet Address Assignment and Aggregation Plan." Cisco Systems. 2006.

\* cited by examiner

| DATA CTR | CONTENT NODE | IP ADRS | 24-bit prefix | 27-bit prefix | ISP |
|---|---|---|---|---|---|
| A | 310 | 321 | 312 | 318 | 306 |
| A | 310 | 322 | 313 | 315 | 307 |
| B | 311 | 323 | 313 | 316 | 307 |
| B | 311 | 324 | 314 | 317 | 308 |

CONTENT NODE SELECTION BASED ON CLASSLESS PREFIX

RELATED APPLICATIONS

This application hereby claims the benefit of and priority to U.S. Provisional Patent Application 61/920,957, titled "CACHE NODE INTERNET PROTOCOL ADDRESS SELECTION BASED ON CLASSLESS PREFIX," filed Dec. 26, 2013, and which is hereby incorporated by reference in its entirety.

TECHNICAL FIELD

Aspects of the disclosure are related to the field of communication networks, and in particular content delivery over communication networks.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include origin hosting servers which originally host network content of content creators or originators, such as web servers for hosting a news website. However, these computer systems of individual content creators can become overloaded and slow due to frequent requests of content by end users.

Content delivery networks have been developed which add a layer of caching between the origin servers of the content providers and the end users. The content delivery networks typically have one or more cache nodes distributed across a large geographic region to provide faster and lower latency access to the content for the end users. When end users request content, such as a web page, which is handled through a cache node, the cache node is configured to respond to the end user requests instead of the origin servers. In this manner, a cache node can act as a proxy for the origin servers. However, when a cache node communicates over different communication service providers, such as Internet Service Providers (ISPs), the various ISPs and other datagram networks over which end user content requests and content delivery are handled can add additional slowdowns and latency issues.

The Internet Protocol (IP) is a standard for routing communication through and between packet-switched networks. The unit of delivery in IP is the datagram, a packet of digital data that includes a routing header. The header includes the IP address of the intended destination of the datagram. An IP address is a unique number. In IP version 4, an IP address has 32 bits. In IP version 6, an IP address has 128 bits. As a datagram is routed, it is transferred between various routers until eventually reaching its destination. Each router uses a routing table to decide to which other router the datagram should be forwarded next. Routers frequently share information to update their routing tables using standard interactions such as Border Gateway Protocol.

An IP address is split logically into two parts: high-order bits and low-order bits. The last router of a route uses the low-order bits to identify which device is the final destination of a datagram. The other routers of a route ignore the low-order bits and use the high-order bits to transfer the datagram from one interconnected network to another. Exactly how many bits are high-order or low-order depends on the routing scheme. Classful routing allows only 8, 16, or 24 bits to be high-order, which can present problems. Classful routing can lead to many entries in routing tables which reduces efficiency in some network topologies. Classful routing does not take advantage of the increased address size of IP version 6, and the availability of unique numbers within the limited space of at most 24 high-order bits does not meet demand for custom topologies. Classless Inter-Domain Routing (CIDR) alleviates these problems by allowing an arbitrary number of high-order bits. CIDR notation is an extended encoding of an IP address that includes a prefix size. The prefix size declares how many bits are high-order, which is the CIDR prefix.

Overview

Systems, methods, apparatuses, and software that announce prefixes associated content nodes of a content delivery network are provided herein. In one example, a method of operating a communication system comprising Internet service providers configured to exchange content requests between end user devices and content nodes is presented. The method includes assigning a content node of the content delivery network a first Internet Protocol (IP) address having an associated first short prefix and a first long prefix, and assigning the content node a second IP address having an associated second short prefix and a second long prefix. The method also includes announcing the first short prefix and the first long prefix to a first Internet service provider communicatively coupled to the content node, and announcing the second short prefix and the second long prefix to a second Internet service provider communicatively coupled to the content node.

In another example, a computer apparatus to operate a management system for a content delivery network that handles content requests for end user devices using content nodes is presented. The computer apparatus includes processing instructions that direct the management system, when executed by the management system, to assign a content node of the content delivery network a first Internet Protocol (IP) address having an associated first short prefix and a first long prefix, assign the content node a second IP address having an associated second short prefix and a second long prefix, announce the first short prefix and the first long prefix to a first Internet service provider communicatively coupled to the content node, and announce the second short prefix and the second long prefix to a second Internet service provider communicatively coupled to the content node. The computer apparatus also includes one or more non-transitory computer readable media that store the processing instructions.

In another example, a management system for a content delivery network that handles content requests for end user devices using content nodes is presented. The management system includes a processing system configured to assign a content node of the content delivery network a first Internet Protocol (IP) address having an associated first short prefix and a first long prefix, and assign the content node a second IP address having an associated second short prefix and a second long prefix. The management system also includes a communication interface configured to announce the first short prefix and the first long prefix to a first Internet service provider communicatively coupled to the content node, and announce the second short prefix and the second long prefix to a second Internet service provider communicatively coupled to the content node.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the views. While multiple embodiments are described in connection with these drawings, the disclosure is not limited to the embodiments disclosed herein. On the contrary, the intent is to cover all alternatives, modifications, and equivalents.

FIG. 4 is an index of route prefixes.

DETAILED DESCRIPTION

Network content, such as web page content, typically includes content such as text, hypertext markup language (HTML) pages, pictures, video, audio, code, scripts, or other content viewable by an end user in a browser or other application. This various network content can be cached by the content nodes of a content delivery network. The network content can include website content, pictures, video, other media, dynamic content, and other content, including combinations thereof. When a content delivery network is employed, content nodes of the content delivery network can act as a proxy to cache content for delivery between origin servers and end user devices.

The content delivery networks typically have one or more content nodes distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes instead of network addresses of the origin servers using domain name system (DNS) registration and lookup procedures.

Figure 1A:
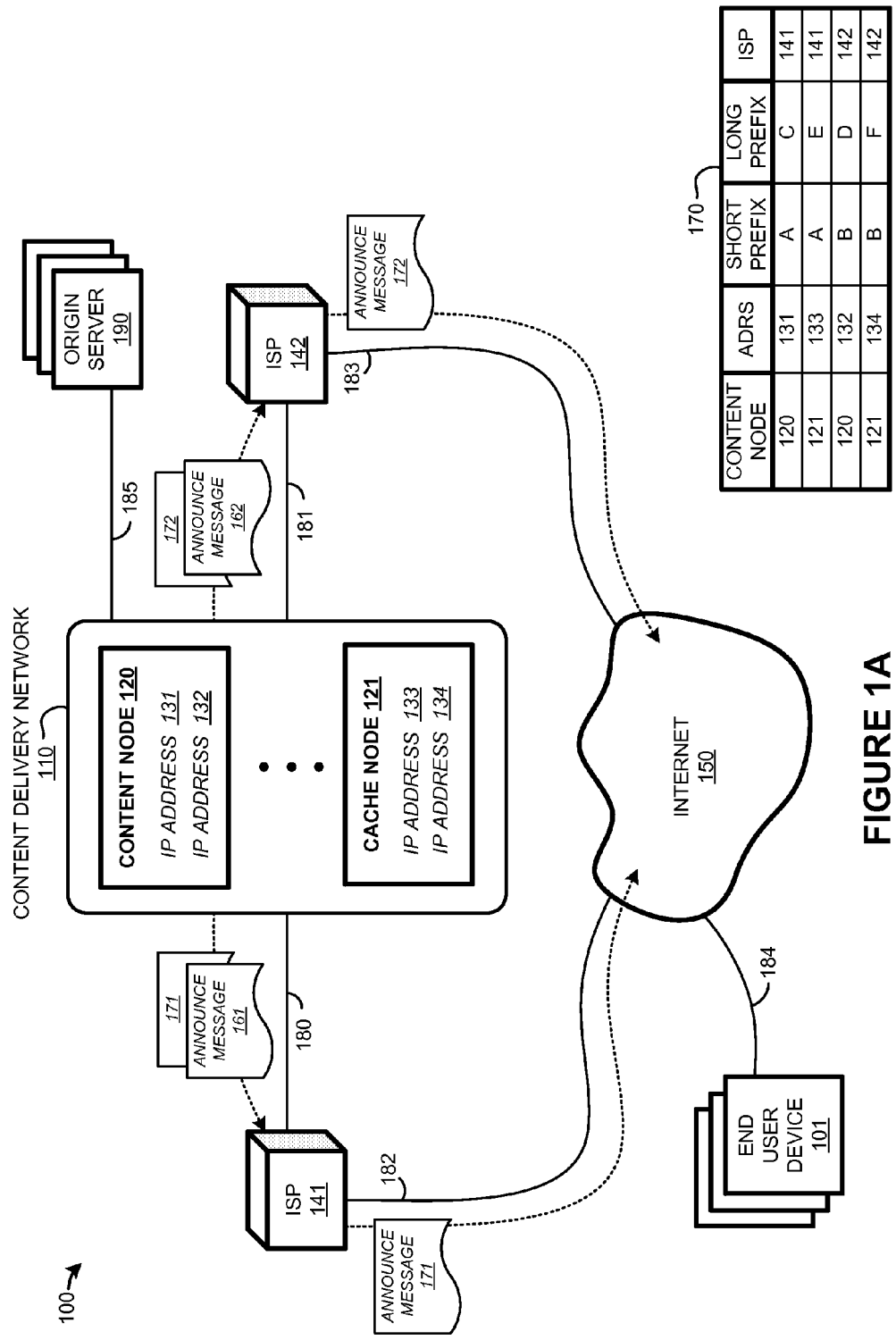
FIG. 1A is a system diagram illustrating a communication system.
Figure 1B:
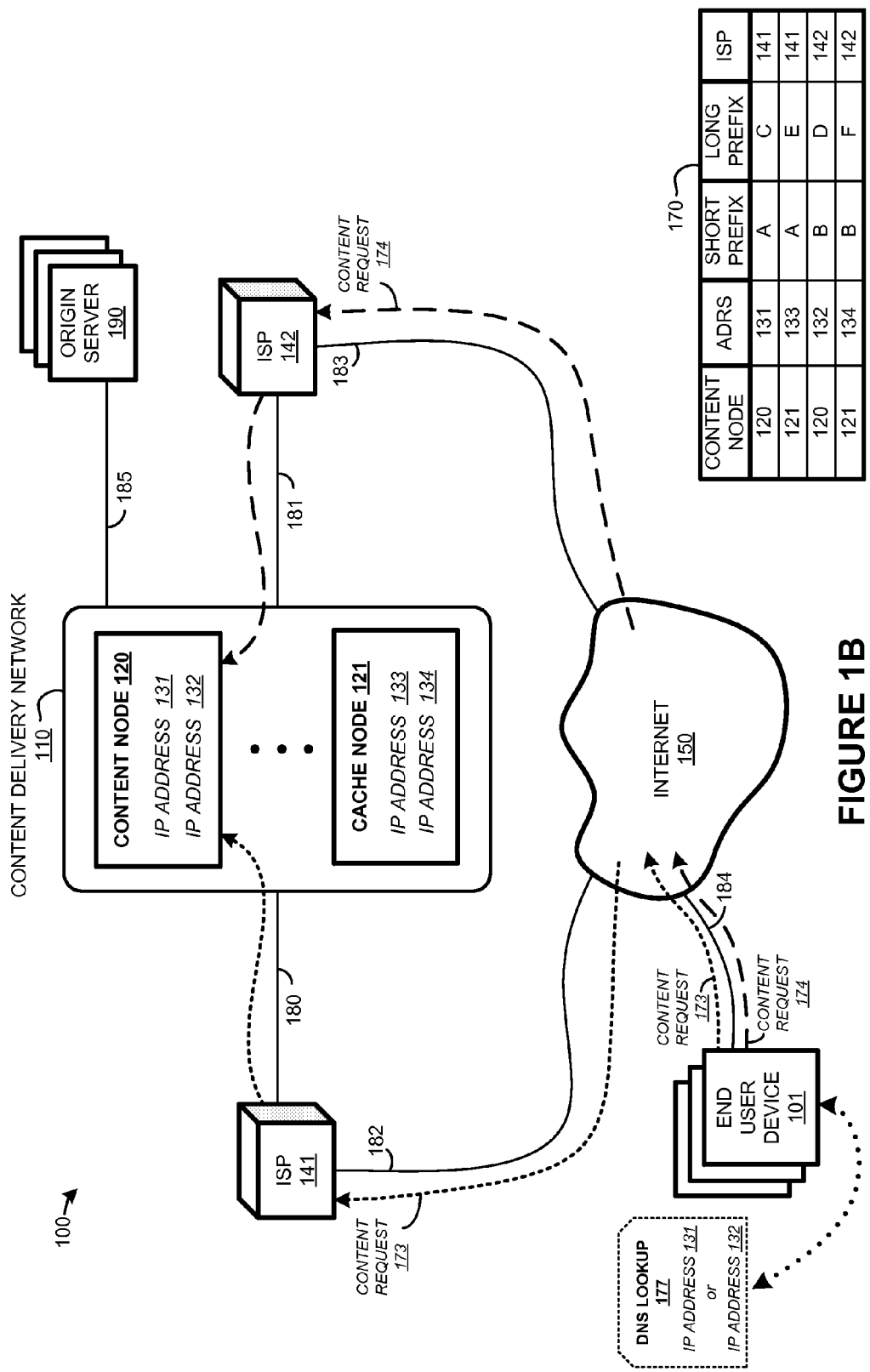
FIG. 1B is a system diagram illustrating a communication system.
Figure 1C:
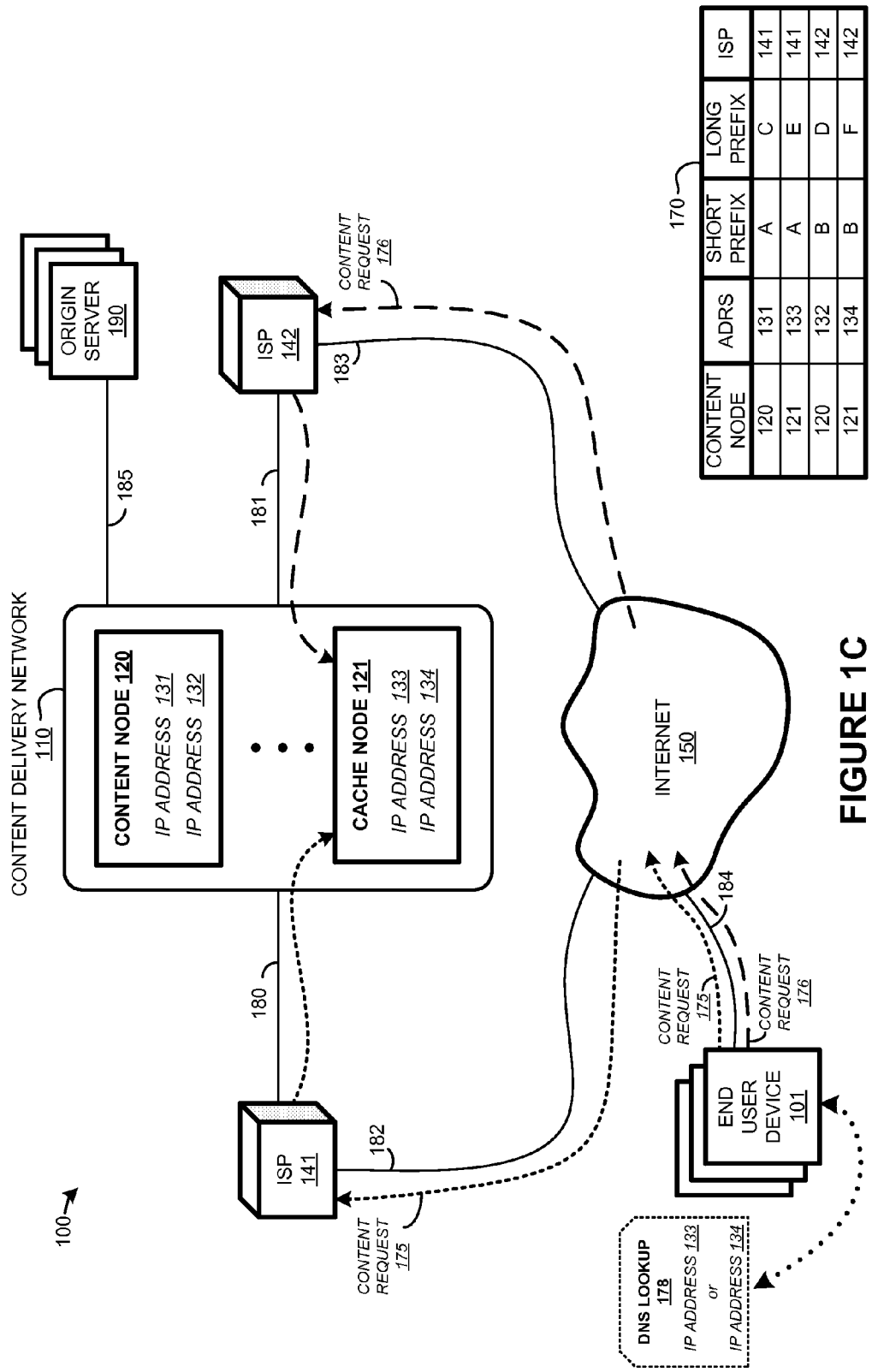
FIG. 1C is a system diagram illustrating a communication system.

As a first example employing a content delivery network, FIGS. 1A-1C are presented. FIGS. 1A-1C are system diagrams illustrating communication system 100. Communication system 100 includes end user device 101, content delivery network 110, Internet Service Providers (ISP) 141-142, Internet 150, and origin server 190. Content delivery network 110 includes one or more content nodes, such as content nodes 120-121. Content delivery network 110 and ISP 141 communicate over link 180. Content delivery network 110 and ISP 142 communicate over link 181. ISP 141 and Internet 150 communicate over link 182. ISP 142 and Internet 150 communicate over link 183. End user device 101 and Internet 150 communicate over link 184. Origin server 185 and content delivery network 110 communicate over link 185. Although not shown in FIGS. 1A-1C for clarity, each link 180-185 can include further networks, links, and other elements.

Each of content nodes 120-121 have multiple associated IP addresses, such as those shown in table 170 in FIG. 1. In this example content node 120 has IP addresses 131-132, and content node 121 has IP addresses 133-134. Each of IP addresses 131-134 is associated with a long prefix having many high order bits. In this example each IP address is associated with a different long prefix. IP address 131 has long prefix C, IP address 132 has a long prefix D, IP address 133 has a long prefix E, and IP address 134 has a long prefix F. A prefix may be a CIDR prefix, where short prefixes are "/24" CIDR prefixes and long prefixes are "/27" CIDR prefixes, although variations are possible. IP addresses 131-134 are also associated with only two short prefixes having less high order bits than the long prefixes. Specifically, IP addresses 131 and 133 are associated with short prefix A, while IP addresses 132 and 134 are associated with short prefix B.

Content delivery network 110 can include network routers or computer systems that announce prefixes to ISPs 141-142 for use in routing content requests to content nodes, such as content nodes 120-121. An announcement may comprise an IP route advertisement communicated to an ISP along the control plane of a routing protocol such as the Border Gateway Protocol. An announcement may instead comprise customized messaging or notifications from content delivery network 110 to the associated ISPs. Content delivery network 110 announces long prefixes C and E to ISP 141 for use in routing content requests into content delivery network 110. Announcement message 161 can be employed to announce long prefixes C and E to ISP 141. Content delivery network 110 announces long prefixes D and F to ISP 142 for use in routing content requests into content delivery network 110. Announcement message 162 can be employed to announce long prefixes D and F to ISP 142.

For each long prefix announced, content delivery network 110 also announces a corresponding short prefix, if the short prefix has not yet been announced. The short prefix includes a subset of the highest order bits of the corresponding long prefix. Content delivery network 110 announces short prefix A to ISP 141 and short prefix B to ISP 142, as further illustrated in table 170. Announcement message 171 can be employed to announce short prefix A to ISP 141. Announcement message 172 can be employed to announce short prefix B to ISP 142.

Responsive to the announcements, ISPs 141-142 only propagate to Internet 150 announcement messages 171-172 that include a short prefix, and do not propagate to Internet 150 announcement messages 161-162 that include a long prefix. Such selective propagation to Internet 150 of announcements affects how routing is performed for content requests traveling through Internet 150 as destined for content nodes 120-121. Internet 150 uses the short prefixes to select either one of Internet service providers 141-142 when routing content requests to content nodes 120-121. A content request transferred by an end user that is associated with short prefix A is routed through ISP 141. Likewise, a content request transferred by an end user that is associated with short prefix B is routed through ISP 142.

After the prefixes are announced, routing of content requests transferred by end users may occur as illustrated in FIGS. 1B and 1C. End user device 101 is representative of an end user computing device that can issue content requests, such as a computing device or a smartphone operating a content browsing application. An ISP is selected by content delivery network 110 based on a short prefix associated with an IP address indicated by the content request. A lookup service, such as a DNS server, informs end user device 101 of an IP address at which cached content is available. End user device 101 issues content requests into Internet 150 using the IP address, and the content requests are transferred for delivery to an associated one of content nodes 120-121.

Figure 2A:
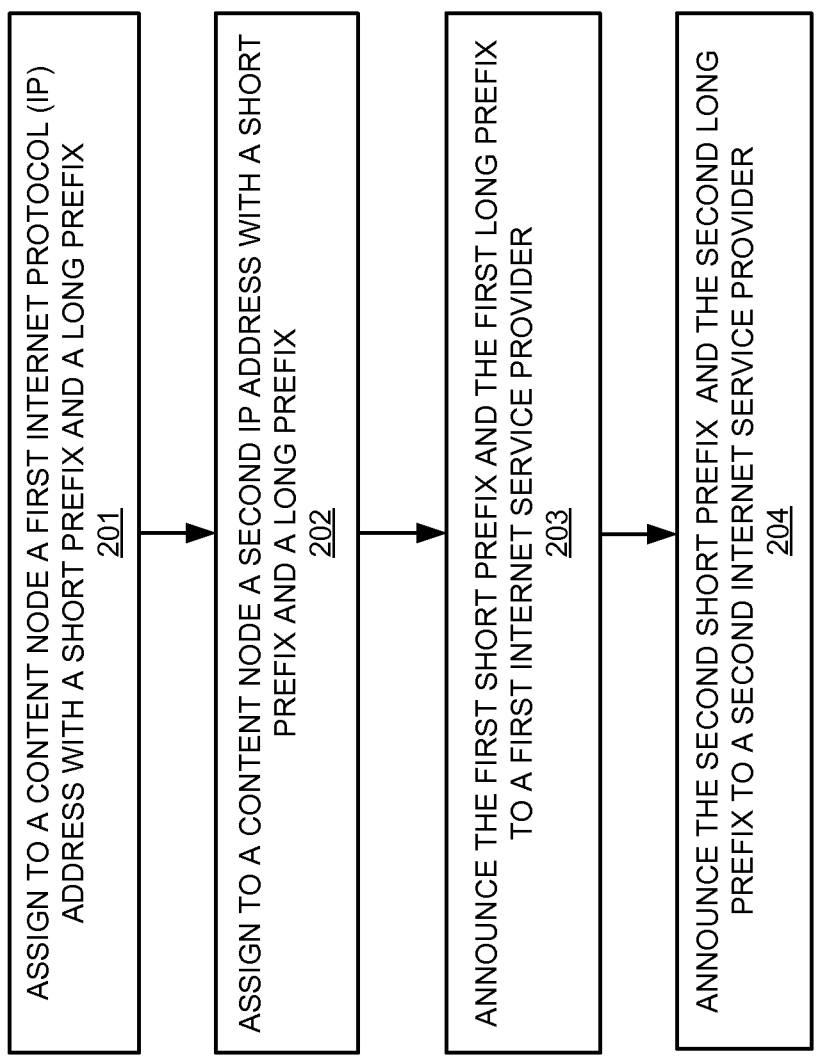
FIG. 2A is a flow diagram illustrating an example method of operating a communication system.
Figure 2B:
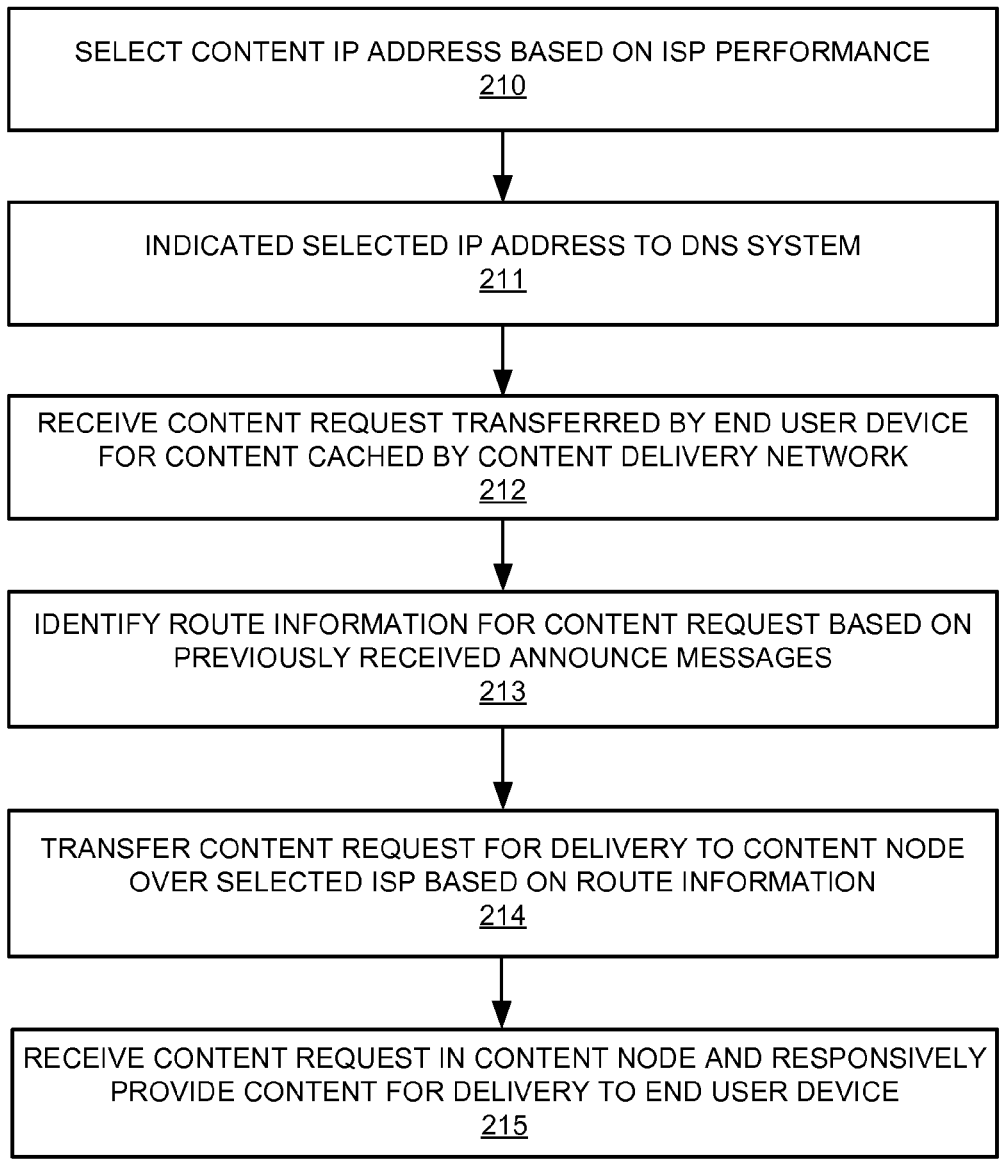
FIG. 2B is a flow diagram illustrating an example method of operating a communication system.

To further illustrate operations of communication system 100, FIGS. 2A-2C are presented. FIGS. 2A-2C are each flow diagrams illustrating a method of operation of FIGS. 1A-1C. Specifically, FIG. 2A illustrates operations for announcing prefixes by communication system 100 of FIG. 1A. FIG. 2B illustrates operations for handling content requests to content node 120, as detailed in FIG. 1B. FIG. 2C illustrates operations for handling content requests to content node 121, as detailed in FIG. 1C.

Referring now to FIG. 2A, content node 120 is assigned (201) IP address 131 that has short prefix A and long prefix C, and content node 121 is assigned (201) IP address 133 that has short prefix A and long prefix E. Content node 120 is also assigned (202) IP address 132 that has short prefix B and long prefix D, and content node 121 is assigned (202) IP address 134 that has short prefix B and long prefix F. This assignment can be seen in FIG. 1A and table 170, where each content node 120-121 is assigned to IP addresses with associated short and long prefixes. Additional IP addresses and associated prefixes can be assigned to each of content node 120-121.

In some examples, a management system is employed in content delivery network 110 to assign IP addresses to associated content nodes and identify associated prefixes. However, the content nodes themselves can be pre-configured with associated IP addresses and prefixes or the content nodes can be identify and assign the IP addresses and prefixes among themselves. Each IP address can be associated with a network interface card (NIC) of a content node, or a NIC can have several IP addresses associated therewith. Also, each content delivery node 120-121 is communicatively coupled to more than one ISP, such as ISPs 141-142 over an associated IP address.

Content delivery network 110 announces (203) prefixes A and C to ISP 141, and announces (203) prefixes A and E to ISP 141. Content delivery network 110 also announces (204) prefixes B and D to ISP 142, and announces (204) prefixes B and F to ISP 142. The announcement messages can be one or more packet messages or other notifications that include indications of the associated prefixes, along with any associated routing information for the prefixes and for the content nodes of content delivery network 110. For example, announcement message 161 can include information to route traffic associated with a particular long prefix to a particular content node, while announcement message 171 can include information to route traffic associated with a particular short prefix over a particular ISP.

In FIG. 1A, announcement message 161 is employed over link 180 to announce prefixes C and E to ISP 141, and announcement message 171 is employed over link 180 to announce prefix A to ISP 141. Similarly, announcement message 162 is employed over link 181 to announce prefixes D and F to ISP 142, and announcement message 172 is employed over link 181 to announce prefix B to ISP 142. In some examples, separate messages or notifications are employed to announce prefixes C and E, and separate messages or notifications are employed to announce prefixes D and F. Also, in some examples, combined announcement messages or notifications are used, where a first announcement message is employed for all announcements to ISP 141 and a second announcement message is employed for all announcements to ISP 142. Other announcement message or notification configurations are possible.

Each content node 120-121 of content delivery network 110 can transfer announcement messages or a management node of content delivery network 110 can transfer the announcement messages. Likewise, each content node 120-121 can communicate with the associated ISPs using one or more communication links, even though only one representative link is illustrated in FIG. 1A. Router or management nodes in each ISP can receive the announcement messages transferred by elements of content delivery network 110. These router or management nodes in each ISP can responsively modify routing tables or routing control processes commensurate with the announcement messages.

Once ISPs 141-142 receive the announcement messages, ISPs 141-142 can further transfer announcement messages 171-172 for delivery to Internet 150. Router or management nodes in Internet 150 can receive the announcement messages transferred by each ISPs 141-142. ISPs 141-142 typically do not transfer long prefix announcements to Internet 150, and instead only transfer short prefix announcement messages, such as announcement messages 171-172. Thus, long prefixes C, E as well as short prefix A are announced to ISP 141, while only short prefix A is announced to Internet 150. Likewise, long prefixes D, F as well as short prefix B are announced to ISP 142, while only short prefix B is announced to Internet 150. Once the router or management nodes in Internet 150 receive the announcement messages, these elements of Internet 150 can responsively modify routing tables or routing control processes commensurate with the announcement messages.

Referring now to FIG. 2B, FIG. 2B illustrates operations for handling content requests to content node 120-121, as detailed in FIG. 1B. In FIG. 1B, end user device 101 can reach content nodes 120-121 by way of more than one ISP, namely ISPs 141-142. To allow for switching between any of ISPs 141-142, the announcement of prefixes is completed as discussed in FIG. 2A. ISPs 141-142 might be selected among based on current network conditions, link characteristics between end user device 101 and content nodes 120-121, or other factors.

During operation, end user device 101 can browse content, such as via a web browser or Internet content application, which a user can selectively request to view web pages, pictures, videos, dynamic content, or other network content associated with a web page. Typically, the web page will reference the associated network content using one or more Uniform Resource Locators (URL) comprising a domain name and any associated path and server details. However, before any network content can be retrieved for display or use by end user device 101, a domain name is typically translated into a numerical network address. This can be achieved using a Domain Name Service (DNS) lookup with a DNS lookup node or DNS server.

In a first example, DNS lookup 177 in FIG. 1B is performed by end user device 101 which returns an IP address associated with the desired network content cached by content node 120. The IP address can be either IP address 131 or IP address 132 for FIG. 1B to reach content node 120. Traffic for each IP address will be routed over a different ISP in FIG. 1B, namely ISP 141 for IP address 131 and ISP 142 for IP address 132. Which particular IP address is returned to end user device 101 by an associated DNS lookup node can vary and in this example is selected by content delivery network 110, such as by a management node within content delivery network 110.

In a second example, DNS lookup 178 in FIG. 1C is performed by end user device 101 which returns an IP address associated with the desired network content cached by content node 121. The IP address can be either IP address 133 or IP address 134 for FIG. 1C to reach content node 121. Traffic for each IP address will be routed over a different ISP in FIG. 1B, namely ISP 141 for IP address 133 and ISP 142 for IP address 134. Which particular IP address is returned to end user device 101 by an associated DNS lookup node can vary and in this example is selected by content delivery network 110, such as by a management node within content delivery network 110.

To select an ISP, content delivery network 110 can identify network characteristics for end user devices, ISPs 141-142, and content nodes, such as content nodes 120-121. For example, content delivery network 110 can observe which of ISPs 141-142 is faster or has lower response latency for content delivery for some set of end user devices. Content delivery network 110 processes the network characteristics and the domain name lookup request to select an IP address with which end user device 101 reaches cached content on content nodes 120-121 or some other content node. Content delivery network 110 can inform a DNS lookup system of which IP address to return for specific domain names based on which ISP currently has the fastest or most desirable route to reach the requested content.

As shown in FIG. 1B, content node 120 supports IP addresses 131-132. Content delivery network 110 selects (210) among IP addresses 131-132 for delivery of content to an end user device for content cached by content node 120. Although IP addresses 131-132 identify the same content node 120, a content request destined for IP address 131 is transferred through a different ISP than a content request destined for IP address 132. This is because IP addresses 131-132 differ in some particular bits which are respectively are associated with different short prefixes A and B.

As shown in FIG. 1C, content node 121 supports IP addresses 133-134. Content delivery network 110 selects (210) among IP addresses 133-134 for delivery of content to an end user device for content cached by content node 121. Although IP addresses 133-134 identify the same content node 121, a content request destined for IP address 133 is transferred through a different ISP than a content request destined for IP address 134. This is because IP addresses 133-134 differ in some particular bits which are respectively are associated with different short prefixes A and B.

The network characteristics or network fastness as mentioned above can refer to different factors. For example, content delivery network 110 can identify predicted network performance for communications exchanged between any end user devices and any content nodes such as content nodes 120-121. Predicted network performance may regard datagram transit time, throughput, response latency, connection establishment delay, price, or a combination of these. Predicted network performance may be based on past or present measurements made by end user devices, content delivery network 110, content nodes such as content nodes 120-121, or some other device that can communicate with the content nodes through Internet 150. Measurements may be made using content requests, ICMP pings, traceroute, or other network interactions. Measurements may be raw or derived and consider statistical concepts, such as peak, mean, median, and the like.

Network conditions affect IP address and prefix selection. For example, if ISP 141 begins to show signs of operational stress, including failures to exceed quality thresholds or response latency thresholds, content delivery network 110 could curtail or discontinue informing end user devices that content node 120 is reachable at IP address 131. Content delivery network 110 informs (211) a DNS system that provides DNS lookup services for end user device 101 of a selected one of IP addresses 131-134, where the selection is based in part on which ISP or content node currently has the more desirable network characteristics. Content delivery network 110 can thus shape traffic in real time according to cost and quality constraints.

Continuing the discussion of FIG. 2B, once end user device 101 has received IP address information to retrieve content, end user device 101 transfers a content request for delivery to the IP address of the associated content node over link 184. Internet 150, or routing elements therein, receives (212) the content request transferred by end user device 101 for content cached by content delivery network 110. The routing elements of Internet 150 identifies (213) route information for the content request based on the previously received announcement messages, such as announcement messages 171-172. In a first example, the previously received announcement messages indicate that traffic addressed for IP addresses 131 and 133 are to be routed over ISP 141 and traffic addressed for IP addresses 132 and 134 are to be routed over ISP 142. Thus, Internet 150 transfers (214) content request for delivery to content node over selected ISP based on route information and the IP address of the content request.

To transfer or route the traffic associated with the content request, routing elements within Internet 150 determine that the destination IP address associated with the content request is associated with a particular short prefix group, as previously indicated in announcement messages or notifications. Elements within Internet 150 will route the packets associated with the content request for delivery to ISP 141 if the destination IP address of the content request falls within the short prefix group for ISP 141. Likewise, elements within Internet 150 will route the packets associated with the content request for delivery to ISP 142 if the destination IP address of the content request falls within the short prefix group of ISP 142.

A content node in content delivery network 110 receives (215) the content request and responsively provides content for delivery to end user device 101. The particular content node that receives the content request depends upon the destination IP address included in the content request, such as the IP address provided by the DNS service responsive to the DNS lookup of end user device 101. The content provided can be any network content as indicated in the content request, such as web page content, multimedia content, pictures, and the like. The appropriate content node transfers the content over any of ISP 141-142 for delivery to end user device 101.

Using the prefix announcement processes described herein, the IP addresses assigned to the content nodes can include IP addresses that are in a tight address space grouping, as well as allow for routing control over which ISP that content requests are routed. For example, IP address 131 and IP address 133 can be included within the same short prefix IP address space, but be in different long prefix address spaces. Specifically, for a full IP address, then IP address 131 and IP address 133 include the same first bits (corresponding to the short prefix) but can differ in the remaining bits (corresponding to the long prefix). Thus, the short prefix can be used for both content node 120 and content node 121. The short prefix is propagated by content delivery network 110 to an associated ISP, such as ISP 141, which responsively propagates the short prefix to routing elements of Internet 150. When content requests are issued by end user devices for an IP address falling within the short prefix address space associated with ISP 141, then these content requests are routed to ISP 141 by Internet 150. Likewise, the different short prefix portions, which are not propagated by ISP 141 to Internet 150, are propagated to ISP 141, and ISP 141 builds internal routing procedures to route IP addresses that fall within these different short prefixes to different content nodes. Advantageously, content delivery network 110 can control routing of content requests for content nodes using the prefix notation. Furthermore, content delivery network 110 can use less IP address space by using the same short prefix for all content requests routed over a particular ISP, while still ensuring the content requests can be routed to different cache nodes using that same particular ISP by employing different short prefixes for different content nodes.

Returning to the elements of FIG. 1, content delivery network (CDN) 110 comprises one or more content nodes, network routing equipment, packet handling equipment, network links, management systems, and other elements. Content delivery network 110 handles delivery of network content to end user devices, such as end user device 101. The network content includes web content, media content, videos, audio, pictures, news, database information, and the like. Content nodes of content delivery network 110, such as content nodes 120-121, cache content for delivery to end user devices. The content can be originated at various other systems, such as origin server 190. In some examples, network content includes dynamic network content, and processes executed by content nodes 120-121 create the dynamic content.

Content nodes 120-121 can each include communication interfaces, network interfaces, processing systems, computer systems, microprocessors, storage systems, storage media, or some other processing devices or software systems, and can be distributed among multiple devices. Examples of content nodes 120-121 can each include software such as an operating system, logs, databases, utilities, drivers, caching software, networking software, and other software stored on non-transitory computer-readable media.

Internet Service Providers (ISP) 141-142 each comprise one or more packet networks configured to route packet communications between endpoints over network links. ISPs 141-142 can include routers, bridges, switches, management systems, network links, and other network routing and handling equipment, including combinations thereof. Typically, each ISP is operated by a distinct service operator or company to provide Internet access services to a variety of customers. In some examples, each of ISPs 141-142 comprise long-haul communication service providers and route packet communications over network links between smaller local ISPs.

Internet 150 comprises one or more packet networks and computer networking systems configured to route packet communications between endpoints. In some examples, Internet 150 includes one or more ISPs over which communications are transferred, and can include a local ISP over which end user device 101 can access Internet 150.

End user device 101 comprises a computing device that can request network content. End user device 101 can include a computer, computing system, tablet, smartphone, web browser, game console, network client, terminal device, or other end user device. In many examples, end user device 101 includes user interface elements, such as a graphical user interface or command line interface, through which a user can browse and request network content. End user device 101 can also include software applications, operating systems, network interface cards, transceivers, processing circuitry, and non-transitory computer-readable media, among other elements.

Origin server 190 can include communication interfaces, network interfaces, processing systems, computer systems, microprocessors, storage systems, storage media, or some other processing devices or software systems, and can be distributed among multiple devices. Examples of origin server 190 can include software such as an operating system, logs, databases, utilities, drivers, caching software, networking software, and other software stored on non-transitory computer-readable media.

Communication links 180-185 each use metal, glass, optical, air, space, or some other material as the transport media. Communication links 180-185 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 180-185 can each be a direct link or can include intermediate networks, systems, or devices, and can include a logical network link transported over multiple physical links. Although one main link for each of links 180-185 is shown in FIGS. 1A-1C, it should be understood that links 180-185 are merely illustrative to show communication modes or access pathways. In other examples, further links can be shown, with portions of the further links shared and used for different communication sessions or different content types, among other configurations. Communication links 180-185 can each include many different signals sharing the same associated link, as represented by the associated lines in FIGS. 1A-1C, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
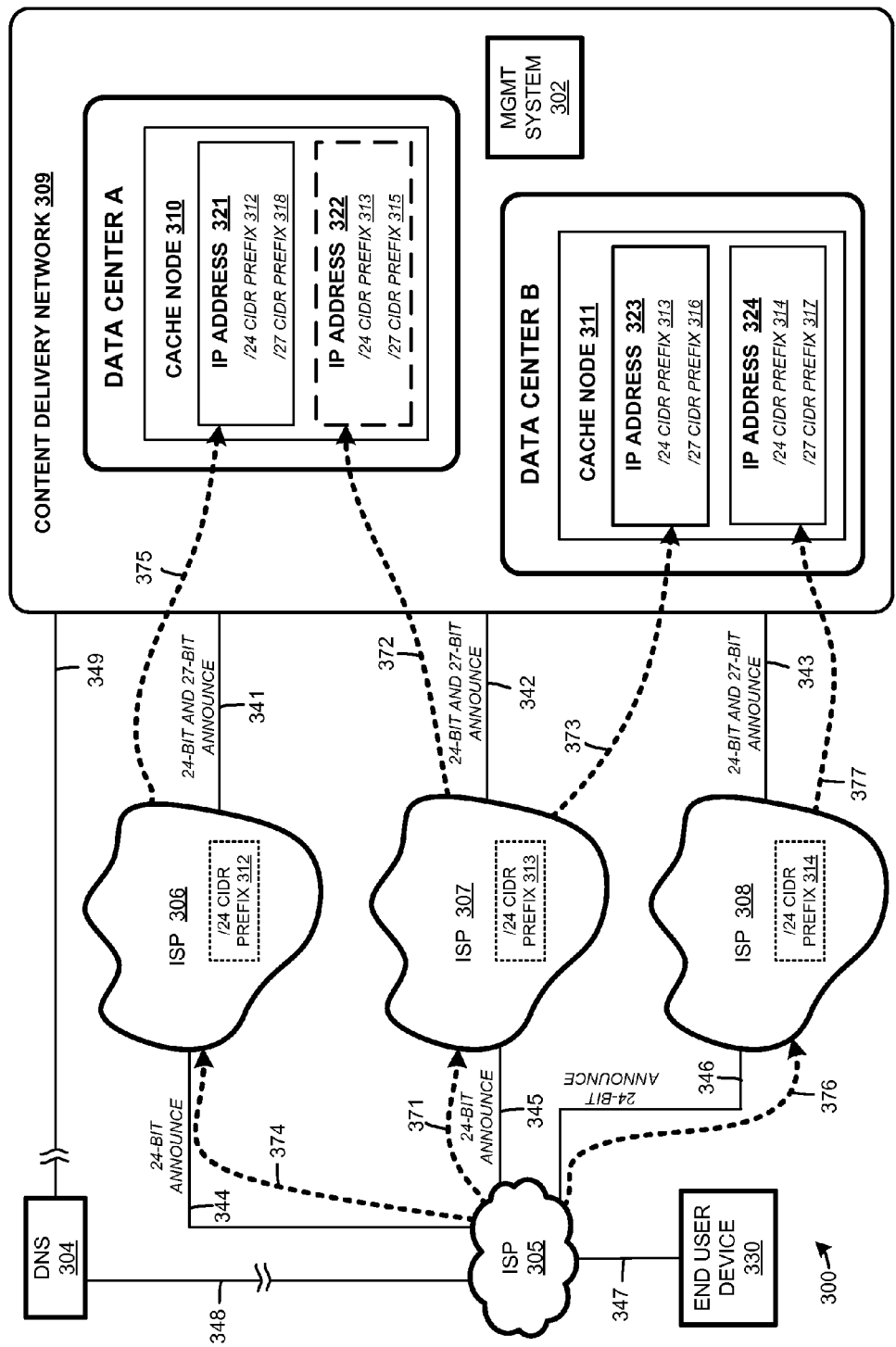
FIG. 3 is a system diagram illustrating a communication system.

As an example employing a content delivery network with 24-bit and 27-bit CIDR prefixes, FIG. 3 is presented. FIG. 3 demonstrates data center selection based on a 27-bit CIDR prefix and ISP selection based on a 24-bit CIDR prefix. FIG. 3 is a system diagram illustrating communication system 300. Communication system 300 includes Internet service providers (ISP) 305-308, content delivery network 309, domain name service (DNS) 304, and at least one end user device 330. FIG. 3 illustrates prefix announcements made by content delivery network 309 and content requests made by end user device 330. Content delivery network 309 includes one or more cache nodes such as nodes 310-311 and one or more management systems 302. Cache node 310 resides in data center A. Cache node 311 resides in data center B. Cache nodes 310-311 can be examples of the content nodes discussed herein, such as content nodes 120-121 in FIGS. 1A-1C, although variations are possible. Management system 302 can be included in the equipment of any of cache nodes 310-311.

Links 341-349 each comprise wired, optical, or wireless packet network links that carry IP traffic between the associated endpoints in FIG. 3. Links 341-349 can further include one or more communication links, routing systems, bridges, switches, modems, and the like, along with associated control and management systems. In some examples, ones of links 341-349 comprise software or logical links.

Management system 302 can include communication interfaces, network interfaces, processing systems, computer systems, microprocessors, storage systems, storage media, or some other processing devices or software systems, and can be distributed among multiple devices. Examples of management system 302 can include software such as an operating system, logs, databases, utilities, drivers, caching software, networking software, and other software stored on non-transitory computer-readable media.

Internet Service Providers (ISP) 305-308 each comprise one or more packet networks configured to route packet communications between endpoints over network links. ISPs 305-308 can include routers, bridges, switches, management systems, network links, and other network routing and handling equipment, including combinations thereof. Typically, each ISP is operated by a distinct service operator or company to provide Internet access services to a variety of customers. In this example, each of ISPs 306-308 comprise long-haul communication service providers and route packet communications over backbone network links between smaller local ISPs. ISP 305 comprises a local ISP over which end user device 330 receives service access to the Internet. In some examples, DNS system 304 is included in ISP 305. In other examples, a two-tier DNS lookup is employed, with DNS system 304 configured to communicate with a DNS system in content delivery network 309 to perform IP address lookup operations.

End user device 330 comprises a computing device that can request network content. End user device 330 can include a computer, computing system, tablet, smartphone, web browser, game console, network client, terminal device, or other end user device. In many examples, end user device 330 includes user interface elements, such as a graphical user interface or command line interface, through which a user can browse and request network content. End user device 330 can also include software applications, operating systems, network interface cards, transceivers, processing circuitry, and non-transitory computer-readable media, among other elements.

DNS system 304 performs IP address translation services for end user devices, such as translating domain names into IP addresses. In some examples, DNS system 304 delegates domain name translation to another DNS system, such as one included in content delivery network 309. In such examples, the delegated DNS system in content delivery network 309 can be included in management system 302. DNS system 304 can include communication interfaces, network interfaces, processing systems, computer systems, microprocessors, storage systems, storage media, or some other processing devices or software systems, and can be distributed among multiple devices. Examples of DNS system 304 can include software such as an operating system, logs, databases, utilities, drivers, caching software, networking software, and other software stored on non-transitory computer-readable media.

In operation, content delivery network 309 has a router or computing system, such as management system 302, that announces CIDR prefixes to Internet service providers 306-308 for use in routing content requests to cache nodes 310-311. A prefix announcement may be a prefix announcement message that indicates the prefixes along with associated routing information. A prefix announcement may be an IP route advertisement communicated to an Internet service provider along the control plane of a routing protocol such as the Border Gateway Protocol, among other protocols and messaging types.

One example prefixes announcement process is as follows. Management system 302 of content delivery network 309 transmits 24-bit and 27-bit CIDR prefix announcements to Internet service providers 306-308 over respective network links 341-343, which are labeled accordingly in FIG. 3. Table 380 of FIG. 4 indicates that content delivery network 309 transmits to Internet service provider 307 24-bit prefix 313 and 27-bit prefixes 315-316. Although not shown, Internet service providers 306-308 propagate to the Internet those announcements they receive that have a 24-bit CIDR prefix. In this example, the 24-bit CIDR prefixes associated with each of ISPs 306-309 are announced to at least ISP 305. However Internet service providers 306-308 do not propagate to the Internet or ISP 305 those announcements they receive that have a 27-bit CIDR prefix. Such selective propagation to the Internet or ISP 305 of announcements affects how routing is performed for content requests traveling through the Internet or ISP 305 which are destined for cache nodes 310-311. The Internet or ISP 305 uses the 24-bit CIDR prefixes to select one of Internet service providers 307-308 when routing content requests to cache nodes 310-311. A content request having 24-bit CIDR prefix 312 is routed through Internet service provider 306. A content request having 24-bit CIDR prefix 313 is routed through Internet service provider 307. A content request having a 24-bit CIDR prefix 314 is routed through Internet service provider 308. In this example, 27-bit prefixes are employed for data center selection, and thus an Internet service provider is configured with a 27-bit prefix is associated with associated data centers. Associations between prefixes and data centers may be encoded in the 27-bit prefix announcements or otherwise configured within the associated Internet service provider.

Content request routing can occur as follows. End user device 330 seeks network content cached in content delivery network 309, such as through a web browsing application executed on end user device 330. Before end user device 330 issues a content request, DNS 304 informs end user device 330 of a selected IP address, such as through a domain name lookup process. The selected IP address is associated with a 24-bit CIDR prefix. In this example, DNS 304 selects IP address 322 which is associated with 24-bit CIDR prefix 313, perhaps because Internet service provider 307 and data center A have network conditions that exceed a network performance threshold. Other factors can be employed in IP address selection for a content request, as discussed herein. DNS 304 can provide both an IP address and a prefix responsive to a domain name lookup issued by an end user device, although in some examples only an IP address is provided. End user device 330 transfers the content request for delivery to the selected IP address, along with any prefix if provided by DNS 304. If data center A begins to show signs of operational stress, including failures to meet quality thresholds, DNS 304 could curtail or discontinue informing end user devices to use IP addresses hosted in data center A. DNS 304 can rebalance the load of content requests between data centers by suggesting IP address 323 hosted in data center B. Because IP addresses 322-323 are hosted in different data centers, IP addresses 322-323 do not share a 27-bit prefix.

ISP 305 initially receives the content request transferred by end user device 330 and identifies the destination IP address of the content request as associated with a 24-bit prefix of a particular one of ISP 306-308. ISP 305 then routes the content request through the particular one of ISP 306-308. When one or ISP 306-308 receive the content request transferred by end user device 330, the associated ISP 306-308 routes a content request for delivery to a data center indicated by the IP address of the content request. Although Internet service providers 306-308 receive from ISP 305 content requests destined for an IP address that falls within an associated 24-bit CIDR prefixes, these Internet service providers instead use the corresponding 27-bit CIDR prefix to route the content requests into content delivery network 309. ISPs 306-308 may accomplish this according to CIDR notation which declares a prefix size. When the ISP receives a content request from ISP 305, the content request can include a destination IP address in CIDR notation declaring a prefix size of 24. By replacing the prefix size 24 with a prefix size 27 and without otherwise altering the destination IP address, the ISP routes the content request to content delivery network 309 according to a 27-bit CIDR prefix. Because ISPs 306-308 have been configured to determine which 27-bit prefix is associated with which data center, ISPs 306-308 are able to route content requests to data centers using the 27-bit CIDR prefix.

Using the prefix announcement processes described herein, the IP addresses assigned to each cache node can include IP addresses that are in a tight address space grouping, as well as allow for routing control over which ISP and data center that content requests are routed. For example, IP address 322 and IP address 323 can be included within the same 24-bit IP address space, but be in different 27-bit address spaces. Specifically, for a 32-bit IP address, then IP address 322 and IP address 323 include the same first 24 bits but can differ in the remaining 8 bits. Thus, /24 CIDR prefix 313 is used for both cache node 310 of data center A and cache node 311 of data center B, even though data center A and data center B might be geographically distant. The 24-bit portion is propagated by content delivery network 309 to an associated ISP, such as ISP 307, which responsively propagates the 24-bit portion to the Internet at large, such as ISP 305, among other routing elements. When content requests are issued by end user devices for an IP address falling within the 24-bit address space of /24 CIDR prefix 313, then these content requests are routed to ISP 307 by the Internet or ISP 305. Likewise, the different 27-bit portions (/27 CIDR prefix 315 and /27 CIDR prefix 316), which are not propagated by ISP 307 to the Internet at large, are propagated to ISP 307, and ISP 307 builds internal routing procedures to route IP addresses that fall within these different 27-bit portions to different data centers, namely data center A and data center B. Advantageously, content delivery network 309 can control routing of content requests for cache nodes in data center A and data center B using the prefix notation. Furthermore, content delivery network 309 can use less IP address space by using the same /24 CIDR prefix for all content requests routed over a particular ISP, while still ensuring the content requests can be routed to different data centers using that same particular ISP by employing different /27 CIDR prefixes for different data centers. Although different data centers are employed in FIG. 3, it should be understood that the same processes can apply to different cache nodes as well.

The example shown in FIG. 3 discusses 27 and 24 bit CIDR prefixes. For other topologies CIDR prefixes with other prefix sizes are appropriate. Although this example shows announcements of CIDR prefixes of both sizes originating from content delivery network 309, an implementation of communication system 300 may instead announce only the longer CIDR prefixes from content delivery network 310, and Internet service providers 306-308 may automatically derive the shorter CIDR prefixes from the longer CIDR prefixes. In yet another implementation the Internet service providers may announce the longer CIDR prefixes as-is and not the shorter CIDR prefixes.

Figure 5:
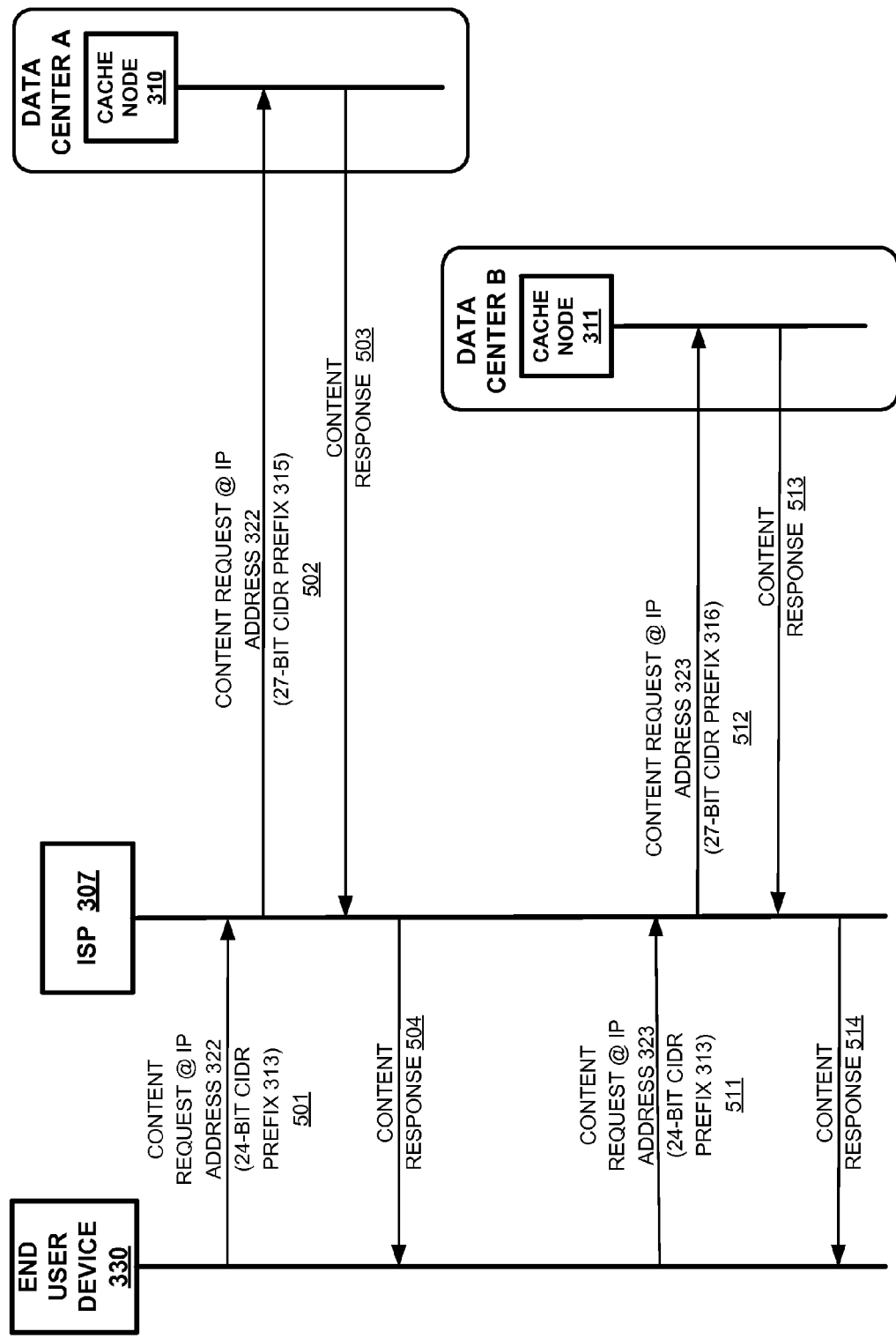
FIG. 5 is a sequence diagram illustrating an example method of operating a communication system.

FIG. 5 is a sequence diagram illustrating a method of operating communication system 300 of FIG. 3. Elements shown in FIG. 5 operate to use IP addresses and CIDR prefixes. Communication system 100 of FIG. 1C may also perform the behavior shown in FIG. 5. During this example, end user device 330 attempts to retrieve content residing on cache node 311.

Initially DNS 304 instructs end user device 330 to use IP address 322 which is associated with 24-bit CIDR prefix 313 to reach content on cache node 310. End user device 330 issues (501) a content request directed to that address over link 347 in FIG. 3. Because IP address 322 is associated with a 24-bit CIDR prefix 313, ISP 305 routs the content request to ISP 307 over pathway 371 in FIG. 3. ISP 307 forwards (502) the content request, but replaces the prefix size of 24 with a prefix size of 27 to produce 27-bit CIDR prefix 315. ISP 307 is configured to route IP addresses for that 27-bit prefix 315 for delivery to data center A, and accordingly routes the content request over pathway 372. Cache node 310 receives the content request and responds (503) with the desired content, which is delivered (504) to end user device 330. Although this example shows the content request and content response being routed through the same ISP 307, any other route may instead be used for delivering the content response.

Later, the fastest data center changes from data center A to data center B. Responsive to domain name translation requests, DNS 304 now instructs end user device 330 to use IP address 323 associated with 24-bit CIDR prefix 313 to reach content on cache node 311. End user device 330 issues (511) a content request directed to that address over link 347 in FIG. 3. Because IP address 323 is associated with a 24-bit CIDR prefix 313, ISP 305 routes the content request to ISP 307 over pathway 371 in FIG. 3. ISP 307 forwards (512) the content request, but replaces the prefix size of 24 with a prefix size of 27 to produce 27-bit CIDR prefix 316. ISP 307 forwards (512) the content request, but replaces the prefix size of 24 with a prefix size of 27 to produce 27-bit CIDR prefix 316. ISP 307 is configured to determine that 27-bit prefix 316 is associated with data center B and accordingly routes the content request over pathway 373. Cache node 311 receives the content request and responds (513) with the desired content, which is delivered (514) to end user device 330.

Figure 6:
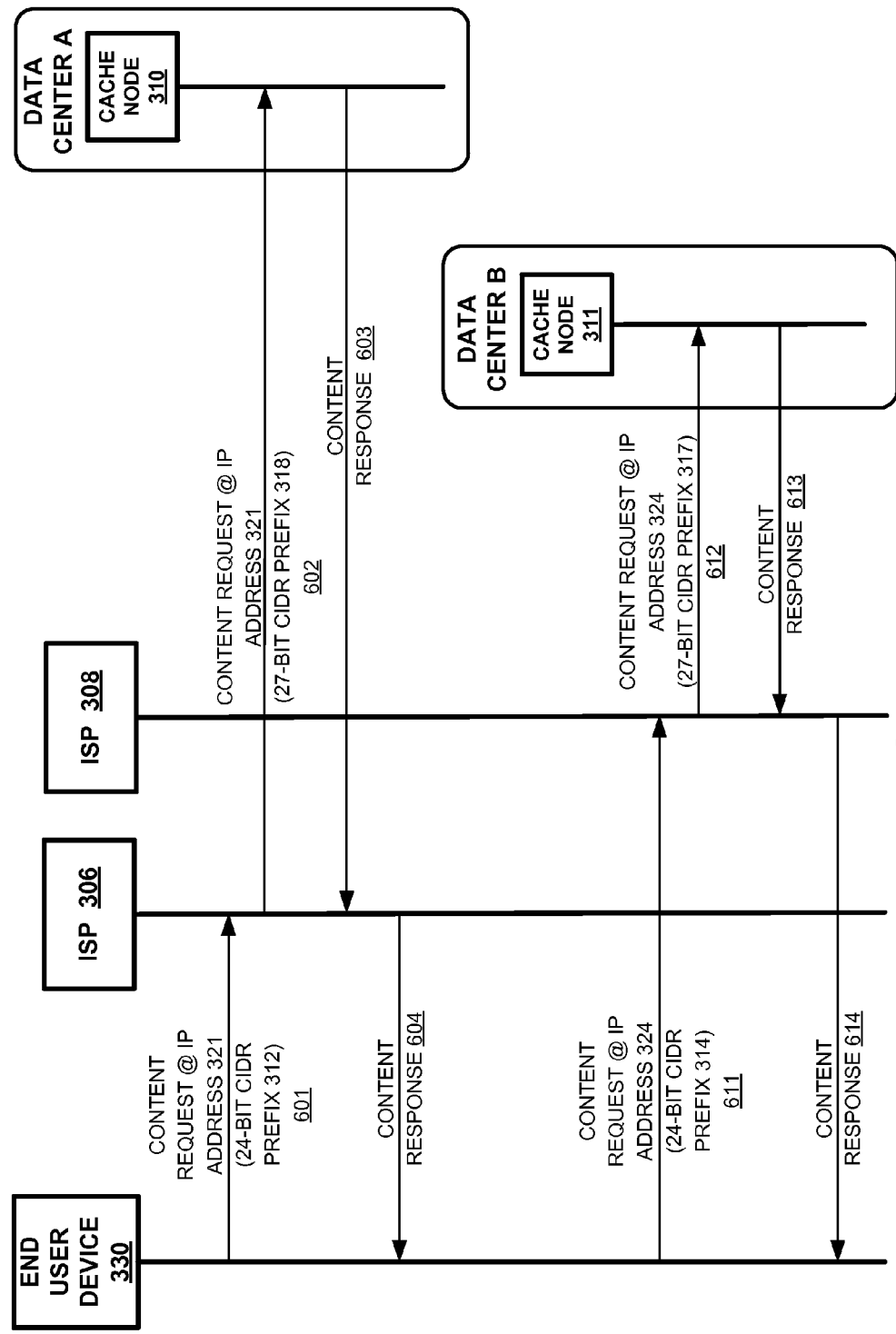
FIG. 6 is a sequence diagram illustrating an example method of operating a communication system.

As a further example of the operation of communication system 300, FIG. 6 is presented. FIG. 6 is a sequence diagram illustrating a method of operating communication system 300 of FIG. 3. Elements shown in FIG. 6 operate to use IP addresses and CIDR prefixes. Communication system 100 of FIG. 1C may also perform the behavior shown in FIG. 6. During this example, end user device 330 attempts to retrieve content residing on cache node 311.

Initially DNS 304 instructs end user device 330 to use IP address 321 which is associated with 24-bit CIDR prefix 312 to reach content on cache node 310. End user device 330 issues (601) a content request directed to that address over link 347 in FIG. 3. Because IP address 321 is associated with a 24-bit CIDR prefix 312, ISP 305 routes the content request to ISP 306 over pathway 374 in FIG. 3. ISP 306 forwards (602) the content request, but replaces the prefix size of 24 with a prefix size of 27 to produce 27-bit CIDR prefix 318.

ISP 306 is configured to route IP addresses for that 27-bit prefix 318 for delivery to data center A, and accordingly routes the content request over pathway 375. Cache node 310 receives the content request and responds (603) with the desired content, which is delivered (604) to end user device 330. Although this example shows the content request and content response being routed through the same ISP 306, any other route may instead be used for delivering the content response.

Later, the fastest data center changes from data center A to data center B. Responsive to domain name translation requests, DNS 304 now instructs end user device 330 to use IP address 324 associated with 24-bit CIDR prefix 314 to reach content on cache node 311. End user device 330 issues (611) a content request directed to that address over link 347 in FIG. 3. Because IP address 324 is associated with a 24-bit CIDR prefix 314, ISP 305 routes the content request to ISP 308 over pathway 376 in FIG. 3. ISP 308 forwards (612) the content request, but replaces the prefix size of 24 with a prefix size of 27 to produce 27-bit CIDR prefix 317. ISP 308 is configured to determine that 27-bit prefix 317 is associated with data center B and accordingly routes the content request over pathway 377. Cache node 311 receives the content request and responds (613) with the desired content, which is delivered (614) to end user device 330.

Figure 7:
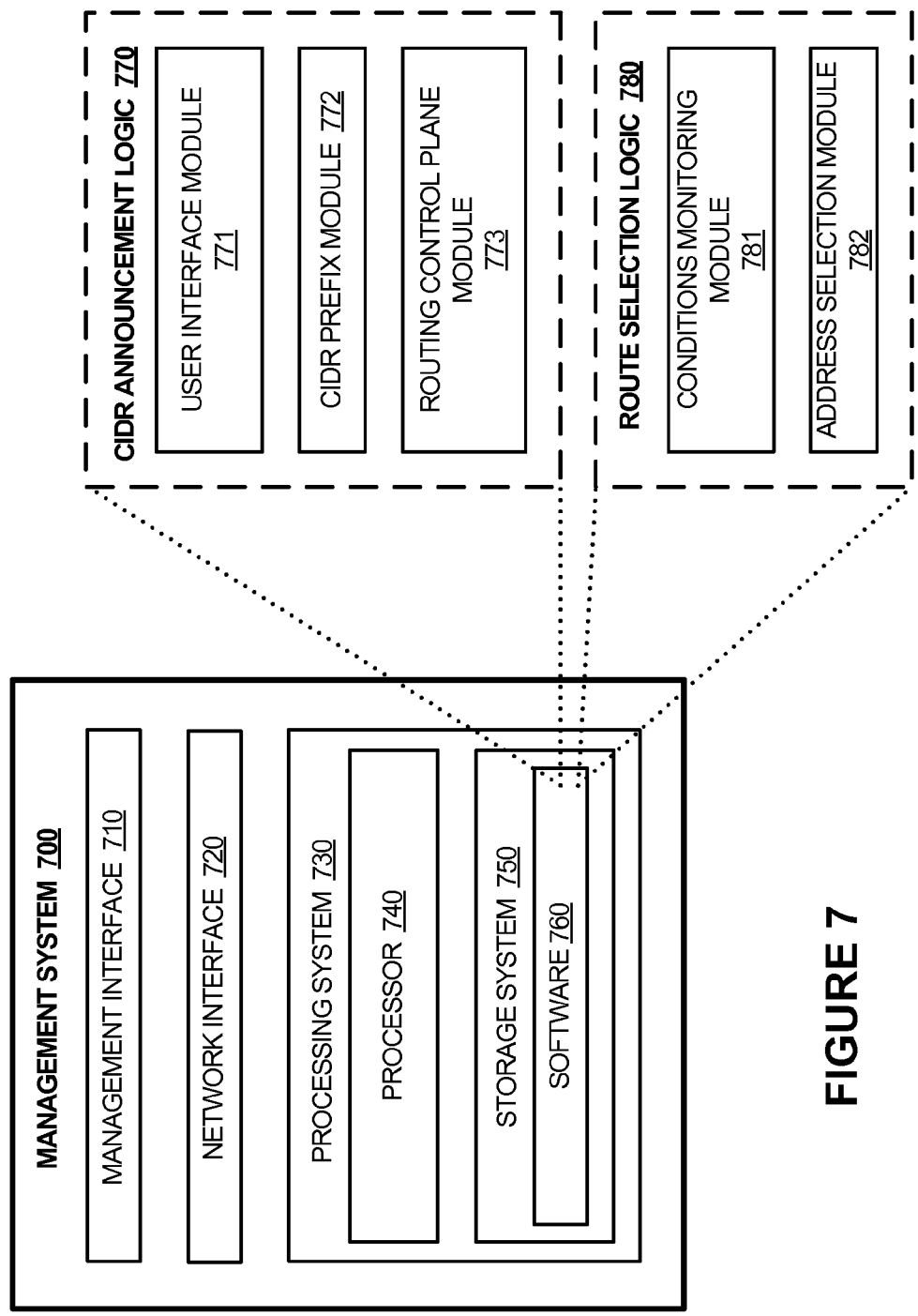
FIG. 7 is a block diagram illustrating a management system.

FIG. 7 illustrates the internal configuration of management system 700. Management system 700 can be an implementation of elements of content delivery network 110, such as portions of content nodes 120-121 in FIGS. 1A-1C, or management system 302 in FIG. 3, although variations are possible. Management system 700 includes management interface 710, communication interface 720, and processing system 730. Processing system 730 includes processor 740 and storage system 750. In operation, processing system 730 is operatively linked to management interface 710, communication interface 720, and storage system 750. Processing system 730 is capable of executing software 760 stored in storage system 750. When executing the software, processing system 730 drives management system 700 to operate as described herein. Management system 700 can also include other elements, such as user interfaces, computer systems, databases, distributed storage and processing elements, and the like.

Management interface 710 includes one or more network interfaces for transferring announcement messages for delivery to ISPs and associated network equipment. Management interface 710 can comprise software interfaces, application programming interfaces (APIs), remote user interfaces, terminal interfaces, and the like. In some examples, management interface 710 is implemented by processing system 730 and communicates over network interface 720. In other examples, management interface 710 is configured to communicate over communication networks, such as packet networks, the Internet, and the like. Management interface 710 can include one or more local or wide area network communication interfaces which can communicate over Ethernet or Internet protocol (IP) links. Management interface 710 can include network interfaces configured to communicate using one or more network addresses, which can be associated with different network links. Examples of management interface 710 include network interface card equipment, transceivers, modems, and other communication circuitry.

Network interface 720 includes one or more network interfaces for communicating over communication networks, such as packet networks, the Internet, and the like. The network interfaces can include one or more local or wide area network communication interfaces which can communicate over Ethernet or Internet protocol (IP) links. Network interface 720 can include network interfaces configured to communicate using one or more network addresses, which can be associated with different network links. Examples of network interface 720 include network interface card equipment, transceivers, modems, and other communication circuitry.

Processing system 730 can be implemented within a single processing device but can also be distributed across multiple processing devices or sub-systems that cooperate in executing program instructions. Examples of processing system 730 include general purpose central processing units, microprocessors, application specific processors, and logic devices, as well as any other type of processing device. In some examples, processing system 730 includes physically distributed processing devices, such as cloud computing systems.

Storage system 750 comprises one or more computer-readable media-based data storage system, although variations are possible. Storage system 750 can comprise any non-transitory storage media readable by processor 740 and capable of storing at least software 760. Storage system 750 can include volatile and nonvolatile, removable and non-removable media implemented in any method or technology for storage of information, such as computer readable instructions, data structures, program modules, or other data. Storage system 750 can include non-volatile storage media, such as solid state storage media, flash memory, or solid state storage system. Storage system 750 can be implemented as a single storage device but can also be implemented across multiple storage devices or sub-systems. Storage system 750 can comprise additional elements, such as controllers, capable of communicating with processor 740.

Software stored on or in storage system 750 can comprise computer program instructions, firmware, or some other form of machine-readable processing instructions having processes that when executed by processing system 730 direct management system 700 to operate as described herein. For example, software drives management system 700 to assign content nodes to be associated with one or more IP addresses with a short prefix and a long prefix, and announce network routing messages that indicate the long prefixes and short prefixes to packet network routing systems, such as elements of ISPs 120-121 in FIGS. 1A-1C or ISPs 306-308 of FIG. 3, among other operations. The software can also include user software applications. The software can be implemented as a single application or as multiple applications. In general, the software can, when loaded into processing system 730 and executed, transform processing system 730 from a general-purpose device into a special-purpose device customized as described herein.

In at least a first example, the machine-readable processing instructions comprise CIDR announcement logic 770, which can include user interface module 771, CIDR prefix module 772, and routing control plane module 773. Implementations of CIDR announcement logic 770 have flexibility as to how many logic modules are present and how responsibilities are distributed amongst the modules. User interface module 771 is configured to interact with a user to configure various parameters associated with management of content nodes, such as receiving IP address assignments for content nodes and identifying which ISPs are linked to a content delivery network, among other operations. User interface module 771 can communicate with management interface 710 for manual or automated entry and maintenance of IP addressing data, such as the IP addresses of cache nodes, CIDR prefix sizes, and the association of CIDR prefixes with Internet service providers. CIDR prefix module 772 can determine CIDR prefixes for one or more IP addresses associated with one or more content nodes, and determine short and long prefixes, such as 24-bit and 27-bit CIDR prefixes, for delivery to routing systems within one or more ISPs. CIDR prefix module 772 analyzes the IP addresses of cache nodes and CIDR prefix sizes to extract 24-bit and 27-bit CIDR prefixes or CIDR prefixes of other sizes as appropriate to a given network topology. Routing control plane module 773 distributes CIDR announcement messages for delivery to ISPs and the Internet, among other destinations. Routing control plane module 773 can delivery routing and handling configuration messages to other routing devices over network interface 720, such as the prefix announcement messages discussed herein. Routing control plane module 773 announces routing data such as CIDR prefixes, perhaps as Border Gateway Protocol advertisements.

In at least a second example, management system 700 provides route selection features which can drive a DNS system to return a particular IP address or prefix responsive to content request domain name lookup requests from end user devices. For example, when management system 700 comprises features of one or more of DNS system 304 or management system 302 of FIG. 3, route selection can be handled by management system 302. The machine-readable processing instructions comprise route selection logic 780, which can include conditions monitoring module 781 and address selection module 782. Conditions monitoring module 781 is configured to monitor conditions of various routes over which content nodes can be reached. These various routes can include various ISPs. The conditions can include network conditions such as response latency of content request fulfillment, throughput of an ISP, bandwidth of links associated with an ISP, throttling status of an ISP, or the network characteristics and network conditions discussed in FIGS. 1A-1C, including combinations and variations thereof. The conditions monitoring can be performed by continual or periodic traffic monitoring for content requests handled by content nodes of an associated content delivery network. Network performance information can be received from content nodes which monitor their own performance and report network conditions to management system 700. Network performance information can be identified by management system 700 by issuing pings, dummy traffic, test traffic, or other monitoring traffic. Conditions monitoring module 781 can identify a desired ISP over which to handle content requests, and can identify a desired data center that includes content nodes or cache nodes. These desired ISPs or desired data centers can be identified based on the network conditions monitored or collected by conditions monitoring module 781. A desired IP address of a content node or prefix of a particular ISP can be identified and provided to a DNS lookup service. As an example DNS lookup service, address selection module 782 is provided. Address selection module 782 can receive a selected or desired IP address or prefix from conditions monitoring module 781. Responsive to domain name translation requests issued by end user devices related to content requests, address selection module 782 can provide the desired or selected IP address or prefix to an end user device. In some examples, a main DNS service is employed by an ISP to initially identify management system 700 as a sub-DNS or secondary DNS lookup service. The secondary DNS lookup service can respond to address translation requests issued by another primary DNS service with the desired or selected IP address that identifies a desired data center or desired content node. In some examples, the secondary DNS lookup service can respond to address translation requests issued by another primary DNS service with the desired or selected IP address as well as a prefix, such as a 24-bit prefix, which identifies an ISP over which the associated content request is to be routed.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system comprising a plurality of Internet service providers configured to exchange content requests between end user devices and content nodes of a content delivery network, the method comprising:

assigning a first content node of the content delivery network a first Internet Protocol (IP) address having an associated first short prefix and a first long prefix;

assigning the first content node a second IP address having an associated second short prefix and a second long prefix;

assigning a second content node of the content delivery network a third IP address having an associated third short prefix and a third long prefix, wherein the first short prefix equals the third short prefix, and the first long prefix does not equal the third long prefix;

announcing the first short prefix and the first long prefix to a first Internet service provider communicatively coupled to the first content node, wherein the first Internet service provider announces the first short prefix to Internet routing elements and routes the content requests destined for the first IP address for delivery to the first content node using the first long prefix, and wherein the first short prefix instructs the Internet routing elements to route content requests destined for the first IP address over the first Internet service provider;

announcing the second short prefix and the second long prefix to a second Internet service provider communicatively coupled to the first content node, and wherein the second Internet service provider announces the second short prefix to the Internet routing elements and routes the content requests destined for the second IP address for delivery to the first content node using the second long prefix, and wherein the second short prefix instructs the Internet routing elements to route content requests destined for the second IP address over the second Internet service provider; and announcing the third short prefix and the third long prefix to the first Internet service provider communicatively coupled to the second content node, wherein the first Internet service provider announces the third short prefix to the Internet routing elements and routes the content requests destined for the third IP address for delivery to the second content node using the third long prefix, and wherein the third short prefix instructs the Internet routing elements to route content requests destined for the third IP address over the first Internet service provider.

2. The method of claim 1, wherein the first short prefix and the second short prefix each comprise a 24-bit classless inter-domain routing (CIDR) prefix, and wherein the first long prefix and the second long prefix each comprise a 27-bit CIDR prefix.

3. The method of claim 1, further comprising:
monitoring network conditions of at least the first Internet service provider and the second Internet service provider;
processing the network conditions to identify a selected IP address from among the first IP address and the second IP address for the end user devices to reach the first content node; and
instructing a domain name service (DNS) system to return the selected IP address responsive to domain name lookup requests for content cached by the first content node.

4. The method of claim 3, wherein the network conditions comprise response latency of content requests of the end user devices fulfilled by the first content node over each of the first Internet service provider and the second Internet service provider.

5. A computer apparatus to operate a management system for a content delivery network that handles content requests for end user devices using content nodes, the computer apparatus comprising:
One or more non-transitory computer readable media that store processing instructions that direct the management system, when executed by the management system, to:
assign a first content node of the content delivery network a first Internet Protocol (IP) address having an associated first short prefix and a first long prefix;
assign the first content node a second IP address having an associated second short prefix and a second long prefix;
assign a second content node of the content delivery network a third IP address having an associated third short prefix and a third long prefix, wherein the first short prefix equals the third short prefix, and the first long prefix does not equal the third long prefix;
announce the first short prefix and the first long prefix to a first Internet service provider communicatively coupled to the first content node, wherein the first Internet service provider announces the first short prefix to Internet routing elements and routes the content requests destined for the first IP address for delivery to the first content node using the first long prefix, and wherein the first short prefix instructs the Internet routing elements to route content requests destined for the first IP address over the first Internet service provider;
announce the second short prefix and the second long prefix to a second Internet service provider communicatively coupled to the first content node, wherein the second Internet service provider announces the second short prefix to the Internet routing elements and routes the content requests destined for the second IP address for delivery to the first content node using the second long prefix, and wherein the second short prefix instructs the Internet routing elements to route content requests destined for the second IP address over the second Internet service provider; and
announce the third short prefix and the third long prefix to the first Internet service provider communicatively coupled to the second content node, wherein the first Internet service provider announces the third short prefix to the Internet routing elements and routes the content requests destined for the third IP address for delivery to the second content node using the third long prefix, and wherein the third short prefix instructs the Internet routing elements to route content requests destined for the third IP address over the first Internet service provider.

6. The computer apparatus of claim 5, wherein the first short prefix and the second short prefix each comprise a 24-bit classless inter-domain routing (CIDR) prefix, and wherein the first long prefix and the second long prefix each comprise a 27-bit CIDR prefix.

7. The computer apparatus of claim 5, wherein the processing instructions further direct the management system to:
monitor network conditions of at least the first Internet service provider and the second Internet service provider;
process the network conditions to identify a selected IP address from among the first IP address and the second IP address for the end user devices to reach the first content node; and
instruct a domain name service (DNS) system to return the selected IP address responsive to domain name lookup requests for content cached by the first content node.

8. The computer apparatus of claim 7, wherein the network conditions comprise response latency of content requests of the end user devices fulfilled by the first content node over each of the first Internet service provider and the second Internet service provider.

9. A management system for a content delivery network that handles content requests for end user devices using content nodes, the management system comprising:
a processor configured to assign a first content node of the content delivery network a first Internet Protocol (IP) address having an associated first short prefix and a first long prefix;
the processor configured to assign the first content node a second IP address having an associated second short prefix and a second long prefix;
the processor configured to assign a second content node of the content delivery network a third IP address having an associated third short prefix and a third long prefix, wherein the first short prefix equals the third short prefix, and the first long prefix does not equal the third long prefix;
a communication interface configured to announce the first short prefix and the first long prefix to a first Internet service provider communicatively coupled to the first content node, wherein the first Internet service provider announces the first short prefix to Internet routing elements and routes the content requests destined for the first IP address for delivery to the first content node using the first long prefix, and wherein the first short prefix instructs the Internet routing elements to route content requests destined for the first IP address over the first Internet service provider;
the communication interface configured to announce the second short prefix and the second long prefix to a second Internet service provider communicatively coupled to the first content node, wherein the second Internet service provider announces the second short prefix to the Internet routing elements and routes the content requests destined for the second IP address for delivery to the first content node using the second long prefix, and wherein the second short prefix instructs the Internet routing elements to route content requests destined for the second IP address over the second Internet service provider and;

the communication interface configured to announce the third short prefix and the third long prefix to the first Internet service provider communicatively coupled to the second content node, wherein the first Internet service provider announces the third short prefix to the Internet routing elements and routes the content requests destined for the third IP address for delivery to the second content node using the third long prefix, and wherein the third short prefix instructs the Internet routing elements to route content requests destined for the third IP address over the first Internet service provider.

10. The management system of claim 9, wherein the first short prefix and the second short prefix each comprise a 24-bit classless inter-domain routing (CIDR) prefix, and wherein the first long prefix and the second long prefix each comprise a 27-bit CI DR prefix.

11. The management system of claim 9, comprising:
the processor configured to monitor network conditions of at least the first Internet service provider and the second Internet service provider;
the processor configured to process the network conditions to identify a selected IP address from among the first IP address and the second IP address for the end user devices to reach the first content node; and
the processor configured to instruct a domain name service (DNS) system to return the selected IP address responsive to domain name lookup requests for content cached by the first content node.

* * * * *